April 25, 1967
S. H. NEWMAN
3,315,496
GAS FUEL CIGARETTE LIGHTER
Filed Oct. 13, 1964
9 Sheets-Sheet 1
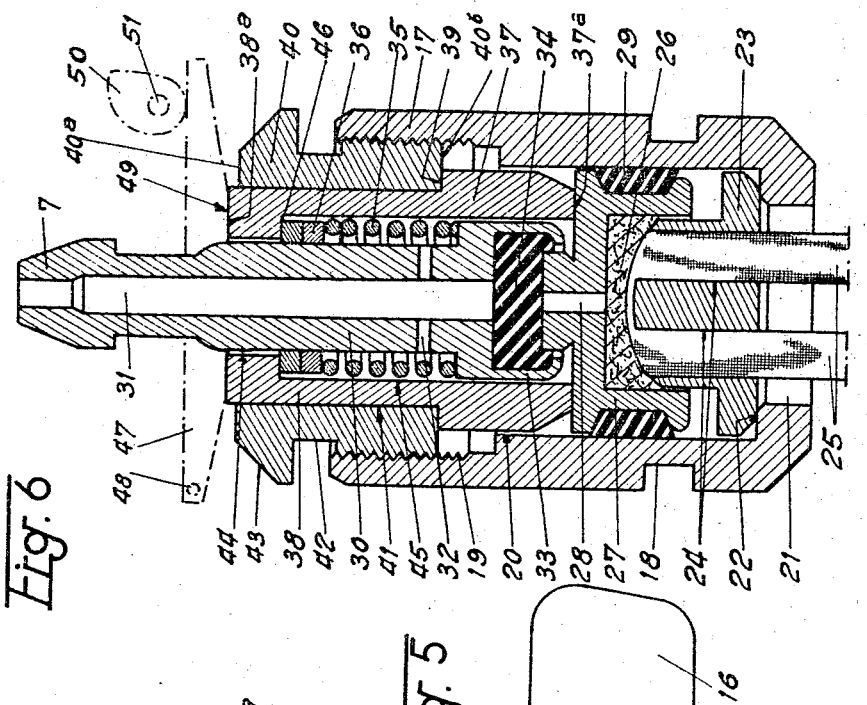
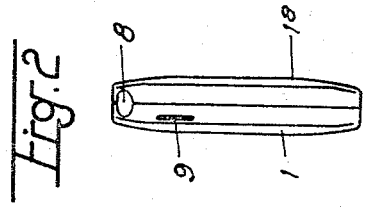
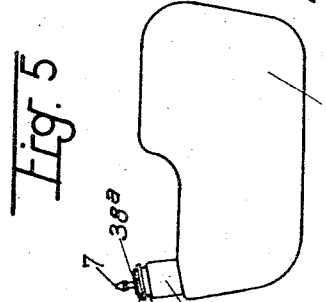
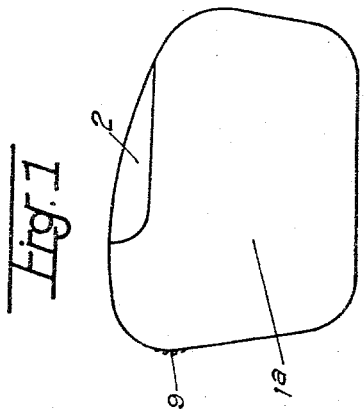
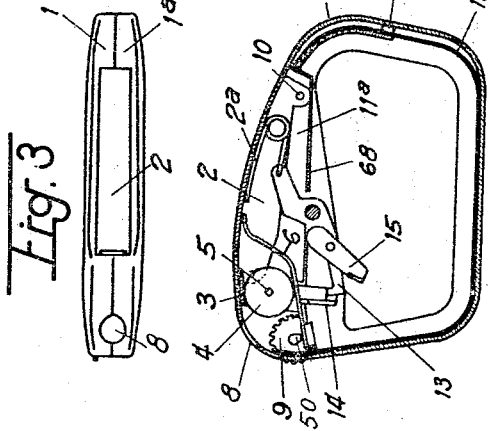
INVENTOR:
STANLEY H. NEWMAN
BY
Curtis, Morris & Safford
ATTORNEYS April 25, 1967  S. H. NEWMAN  3,315,496
GAS FUEL CIGARETTE LIGHTER
Filed Oct. 13, 1964  9 Sheets-Sheet 2
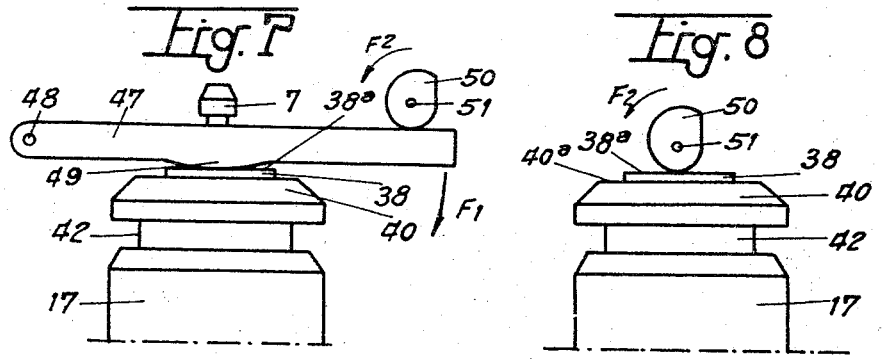
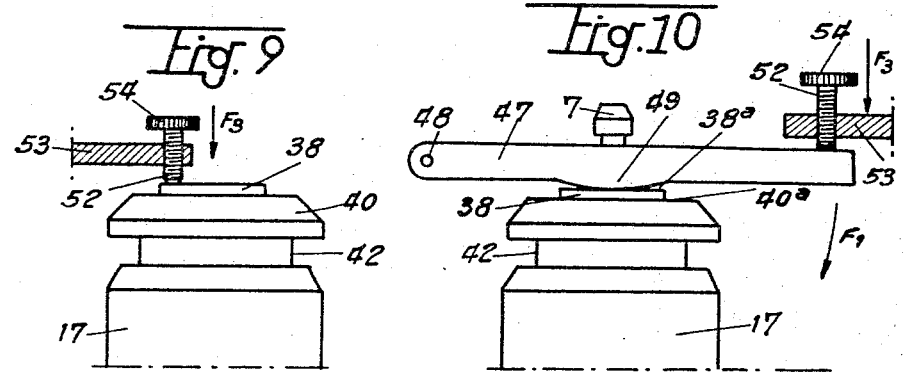
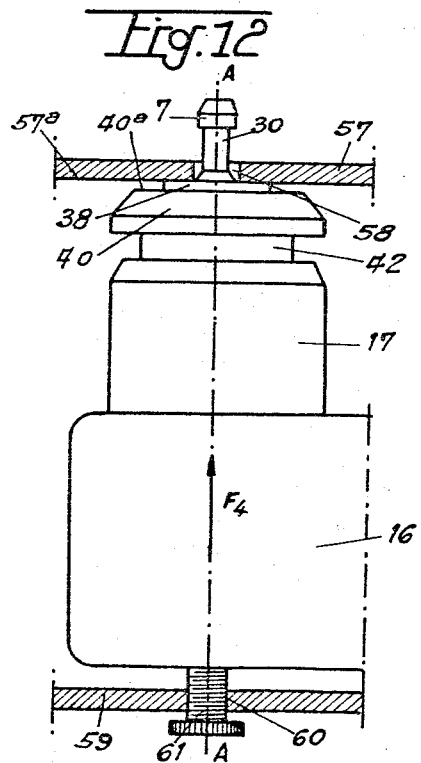
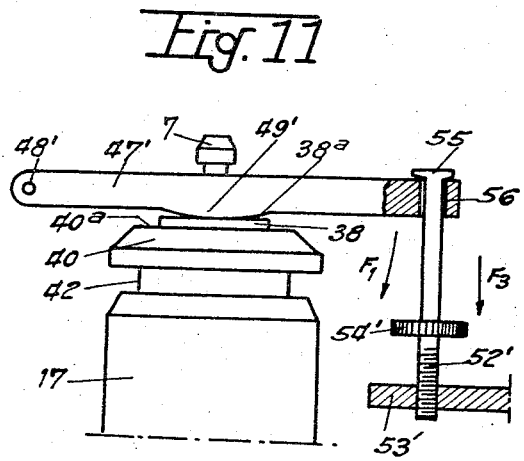

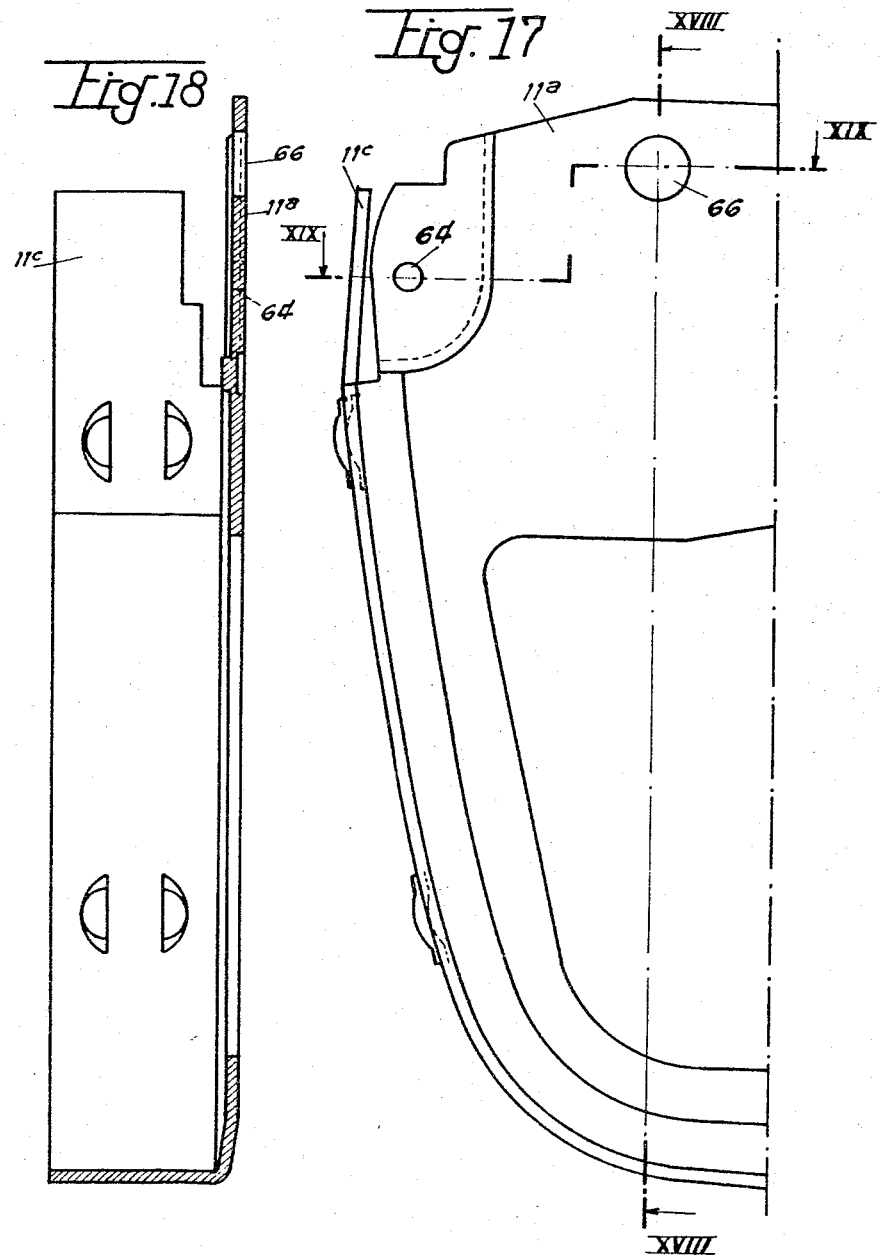
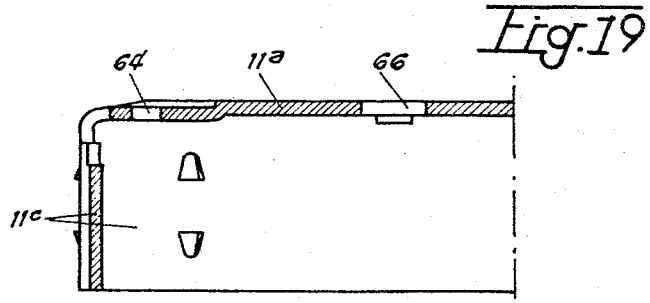

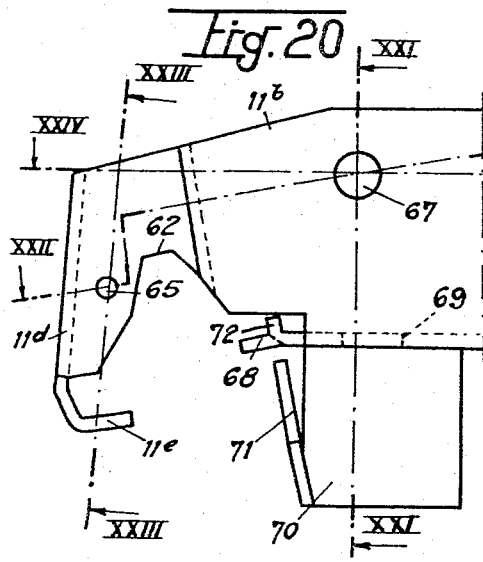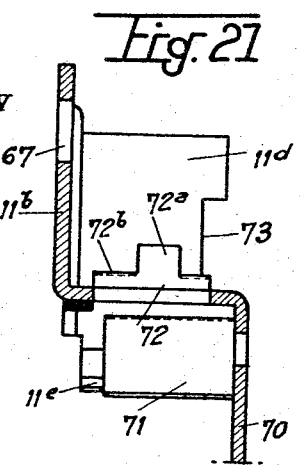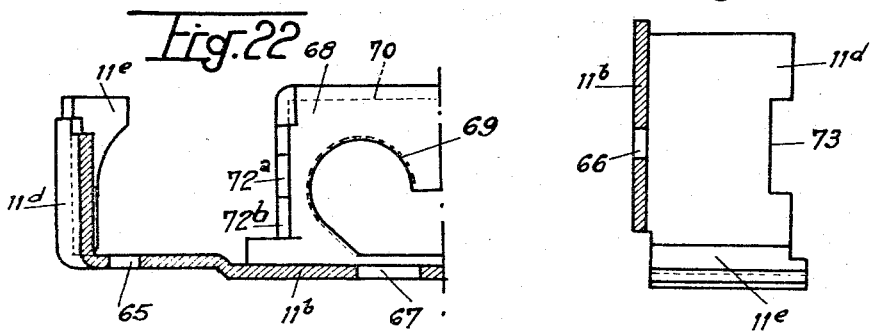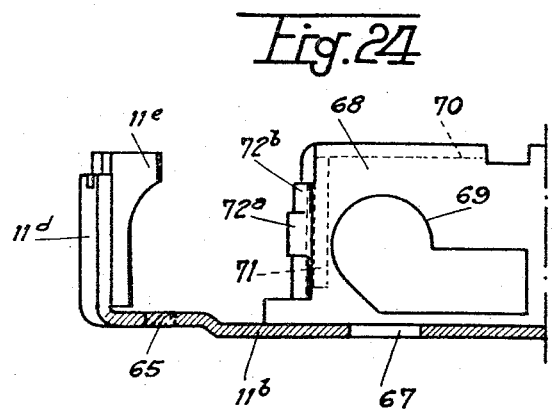

April 25, 1967  S. H. NEWMAN  3,315,496
GAS FUEL CIGARETTE LIGHTER
Filed Oct. 13, 1964  9 Sheets-Sheet 9
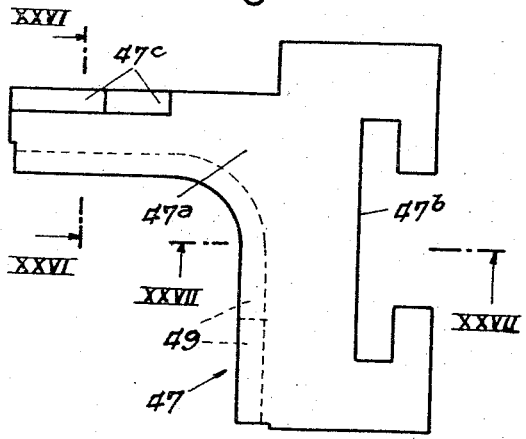
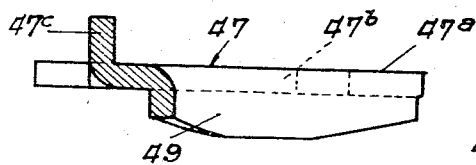
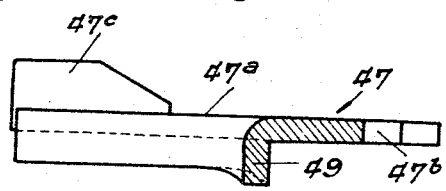
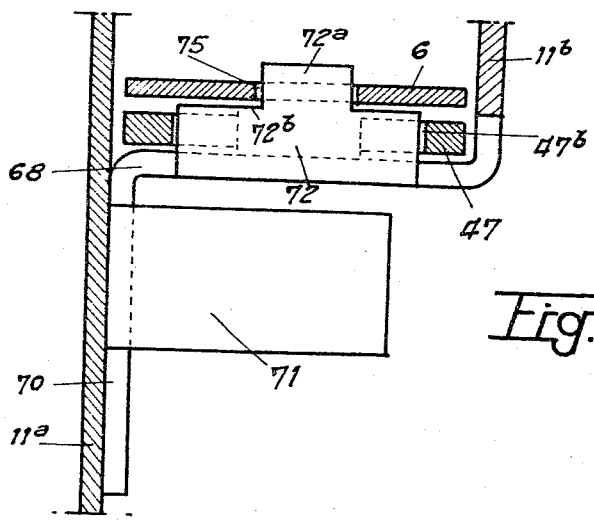

United States Patent Office 3,315,496
Patented Apr. 25, 1967

3,315,496
GAS FUEL CIGARETTE LIGHTER
Stanley H. Newman, 19 E. 70th St.,
New York, N.Y. 10021
Filed Oct. 13, 1964, Ser. No. 403,551
Claims priority, application France, Feb. 19, 1964,
964,355
9 Claims. (Cl. 67—7.1)

In U.S. Patent No. 3,218,831, issued Nov. 23, 1965, there is described a valve for a gas cigarette lighter comprising a cylindrical body having an axial bore which is partially provided with an internal thread, a threaded adjustment member provided with an axial bore in which there slides a piston which in its turn is provided with a channel for the gas, a spring acting between the piston and a sealing ring, a rubber closure member borne by the piston, a cup pierced by a channel for the gas and hermetically mounted in the smooth part of the bore of the body, a washer of blotting paper, a compression member pierced by a channel for the passage of a wick and an elastic joint between the compression member and the cup. It is thus possible to adjust the height of the flame by greater or lesser compression of the porous mass consisting of the blotting-paper washer between the cup and the compression member, said cup moving with a movement of translation under the action of the rotation of the adjusting member.

This system operates perfectly, but since the valve is rigidly connected with a tank which is replaced when it is empty, it is rather difficult to provide a device for turning the adjusting member which can remain permanently attached and is readily accessible when the gas it lit. For this purpose, there is provided a removable wrench which is put in place at the time of adjustment and then removed.

However, this wrench is of small size and there is the danger that it will be lost. It is therefore desirable to provide a mechanism which is permanently fastened to the body of the lighter and which automatically comes into engagement with a suitable part of the valve when a tank provided with its valve is placed in the body of the lighter.

A device of this type is described in French Patent No. 1,348,965 of Mar. 1, 1963. It permits on the one hand a fine adjustment between two relatively close valves and on the other hand a rough adjustment within the total adjustment range made possible by the construction of the valve.

However, this known device has the drawback that when the user has arrived at the limit of the precision adjustment range, it is necessary to disengage a pawl system and to return the knurled adjustment wheel back so as to cause it to make another limited stroke and so on. The amplitude of the rotation of the knurled wheel being small, for reasons of construction, a considerable amount of time is necessary in order to pass from one end of the total adjustment range to the other.

Thus, it was deemed preferable definitely to separate the rough adjustment from the fine adjustment. The rough adjustment will in general be effected at the factory, the user merely effecting the fine adjustment, depending for instance on whether he wishes to light a cigarette or a pipe. However, it must at all times remain possible easily to modify the rough adjustment if the lighter is to be used permanently under exceptional conditions, for instance in the open air, where it is obviously desirable for the flame—for all proportions are maintained—to be higher due to the wind than within a building.

Under these conditions, the rough adjustment may without drawback be effected by hand or by means of a removable wrench or key, and the fine adjustment effected by means of a device which is rigidly connected with the body of the lighter.

Accordingly, the object of the present invention is a lighter provided with a valve of the aforementioned general type, but in which the adjustment is effected in two stages—a rough adjustment by rotation of an adjusting member and a fine adjustment by linear sliding of a piston inserted between the adjusting member and the cup and itself actuated in any suitable manner from the outside of the lighter in which the valve is mounted.

Preferably, the piston is actuated by a cam system which acts directly or via a lever, or else by a screw system, with or without the use of a lever.

In the accompanying drawings, various embodiments of the invention have been shown schematically by way of example.

FIG. 1 is a side elevation, FIG. 2 an end elevation and FIG. 3 a plan view of a lighter in accordance with the invention.

FIG. 4 is a vertical central section, drawn very schematically, through this lighter, without the tank bearing the valve.

FIG. 5 is an elevation of the tank-valve body assembly.

FIG. 6 is an axial cross-section on a larger scale through the valve of the invention.

FIGS. 7 to 12 show the principle of various fine-adjustment systems.

FIG. 17 is a partial side elevation of one-half of the belt, seen from the inside of the lighter.

FIGS. 18 and 19 are cross-sections along the lines XVIII—XVIII and XIX—XIX respectively of FIG. 17.

FIG. 20 is a partial side elevation of the other half of the belt, taken from the same point of view as FIG. 13.

FIGS. 21 to 24 are cross-sections along the lines XXI—XXI, XXII—XXII, XXIII—XXIII and XXIV—XXIV respectively of FIG. 20.

FIG. 25 is a plan view of the intermediate fine adjustment lever.

FIGS. 26 and 27 are cross-sections along the lines XXVI—XXVI and XXVII—XXVII of FIG. 25.

FIG. 28 is a cross-section along the line XXVIII—XXVIII of FIG. 14.

Figure 13:
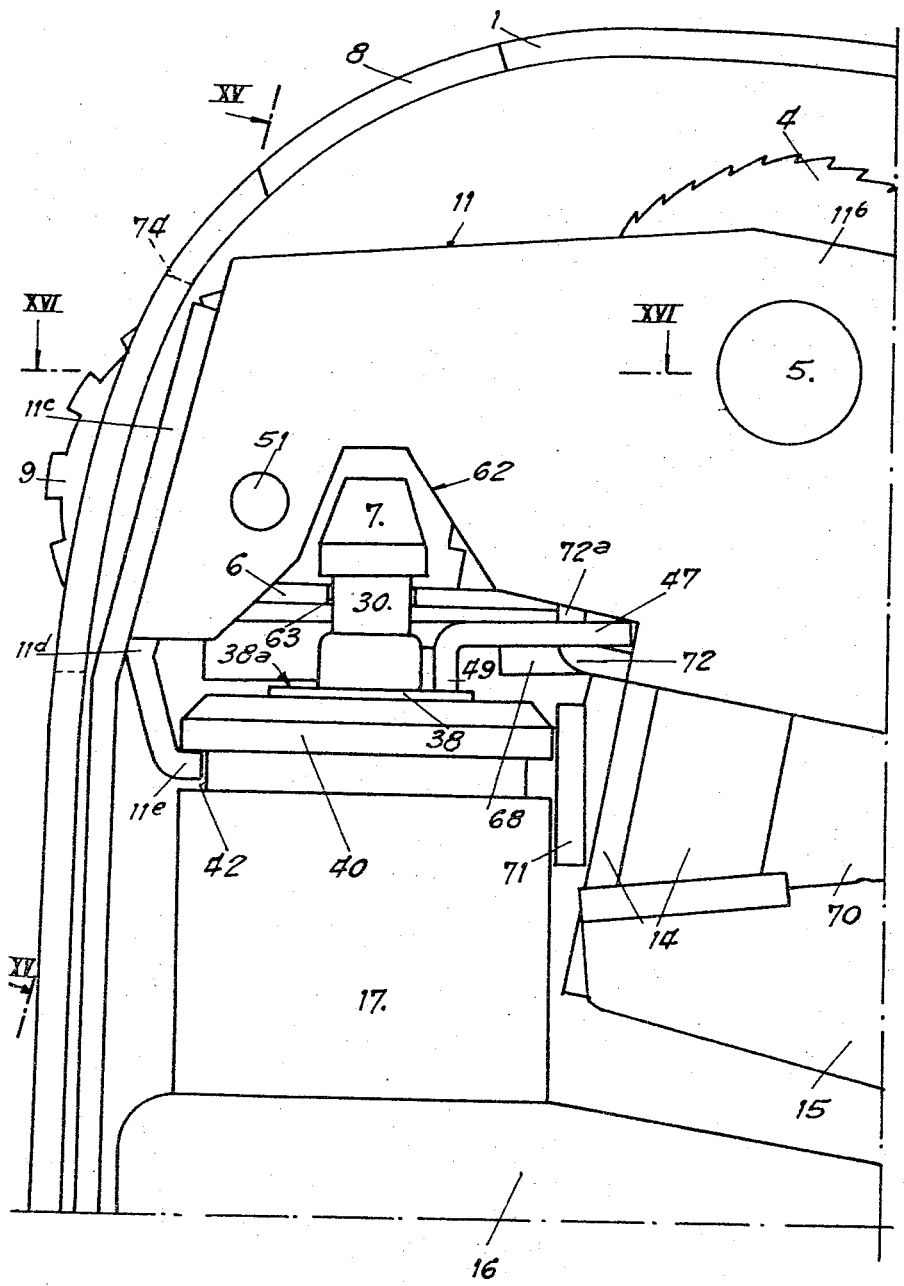
FIG. 13 is a partial side elevation on a larger scale, showing the practical application of the adjusting system of FIG. 7 with one of the shells forming the housing of the lighter removed.

As shown by FIGS. 1 to 4, the overall shape of the lighter is similar to the shape of the lighter which forms the subject matter of U.S. Patent No. 3,181,317 issued May 4, 1965. The housing is formed of two shells 1, 1a which, at their upper part, are cut out to permit the passage of an operating push member 2 which is under the action of a spring 2a and which when it is depressed by a finger against the action of the said spring, causes—via a drive member 3—a knurled wheel 4 which is pivoted around a pin 5 to turn and actuates a valve lever 6 which lifts the head 7 of the burner (FIGS. 5 to 16) to permit passage of the gas. The flame emerges from the housing through a hole 8 provided half in each of the shells 1a and 1. The fine adjustment of the height of the flame is effected by means of a knurled wheel 9 (FIGS. 1 to 4 and 13 to 16) in a manner which will be described hereinbelow.

The pushmember 2 is pivoted at 10 (FIG. 4) to a mechanism-holder belt 11 similar as a whole to that described in the aforesaid Patent No. 3,181,317. This belt is housed in the shells 1, 1a, which are fastened to it by a system 12 similar to that shown in FIGS. 6, 10, 16, 25 and 26 of said patent. A flint-push lever 13 (FIG. 4) presses a flint (not shown) which is contained in a flint-holder tube 14 (FIGS. 4, 13 and 14) against the knurled wheel 4 and can be retracted by a pivoted lever 15 (FIGS. 4 and 13) in order to change the flint. The part of the mechanism which has just been described is known as a whole and does not in itself form part of the invention, nor does the tank 16, the shape of which can be noted from FIG. 5 and which bears the valve body 17.

If one now refers to FIG. 6, it can be seen that the valve body 17 is held fast by an annular groove 18 in the upper face of the tank 16 (FIG. 5). The body 17 is pierced axially by three coaxial bores having different diameters. The upper bore 19 is threaded on the inside and has the largest diameter. The central bore 20 is smooth and of a slightly smaller diameter and the lower bore 21 is also smooth and of still smaller diameter so as to form a wide annular shoulder 22 which serves as support for a compression member 23. The latter is pierced by two parallel channels 24 (which, in a variant, not shown, may be formed of longitudinal grooves extending along two diametrically opposite generatrices of a cylindrical compression member provided with an annular flange which rests against the shoulder 22) in which there extends a wick 25 which dips into the tank 16 through the bore 21 and is in contact with a porous washer 26 of blotting paper or similar material. This washer is applied against the wick 25 and the member 23 by a cup 27 pierced by an axial channel 28 and which can move freely in the bore 20 with the interposition of a gasket 29. The burner 7 forms a piston 30 pierced by an axial channel 31 and a transverse channel 32, and the head 33 of which bears a gasket 34 which can close the upper end of the channel 28. A spring 35 interposed between the head 33 and a gasket 36 urges the piston 30 against the cup 27. The construction described up to now is identical to the construction of the valve which forms the subject matter of the said U.S. Patent No. 3,218,831.

However, in accordance with the invention, the piston 30, 33, which forms the burner, slides in an adjusting piston having the shape of a cylindrical sleeve formed of two parts of different diameters. The lower part 37 of large diameter slides freely in the bore 20 while he upper part 38 has a smaller diameter which provides an outer annular shoulder 39. Against this shoulder, there rests a cylindrical part 40 forming an adjustment screw, pierced by a smooth inner bore 41 in order to receive with a soft frictional fit the part 38 of the sleeve, said cylindrical part being threaded on the outside so that it can be screwed into the internally threaded bore 19. The upper end of the screw 40 has a groove 42, the height of which is greater than the maximum stroke provided for the screw 40. It can have a periphery 43 which is striated to facilitate the rotating thereof by hand or may have means, for example, for connecting an operating key or wrench thereto. The sleeve 37, 38 is furthermore pierced axially by a bore 44, 45, formed of two parts of different diameters the connection between which provides at 46 an annular shoulder forming a resting surface for the gasket 36, the bore 44 freely receiving the piston 30 and the bore 45 receiving the spring 35 and, with clearance, the head 33 of the piston 30. The length of the upper part 38 of the sleeve 37, 38 is such that when the screw 40 rests against the shoulder 39, the upper end of the sleeve protrudes slightly with respect to the upper surface 40a of the screw 40.

The operation of the valve is as follows:

After having successively mounted the part 23 with the wick 25 against the shoulder 22, and the assembly formed by the cup 27, its gasket 29 and the porous washer 26, the assembly formed by the gasket 36, the piston 30, 33, its gasket 34, and the spring 35 is mounted in the sleeve 37, 38 and the lower face 37a of the sleeve is brought into contact with the upper face of the cup 27. The screw 40 is then placed over the upper part 38 of the piston-sleeve and screwed into the internally threaded bore 19 until the lower face of the screw comes into contact with the shoulder 39. Upon continuing to turn the screw 40, the sleeve 37, 38 and the cup 27 are driven downward compressing the washer 26 against the upper face—which is preferably convex as shown—of the part 23 which cannot move. However, by design, it has been constructed so that when the face 40b of the screw 40 arrives at the lower end of the inner thread of the bore 19 of the body 17, the washer 26 is not compressed to the maximum and that one can increase this compression slightly by pushing on the upper face 38a of the sleeve 37, 38 so as to bring it flush with the face 40a of the screw 40 in a manner which will be described below.

One can thus effect a rough adjustment or preadjustment of the height of the flame by turning the screw 40 and then a fine adjustment by pushing the sleeve 37, 38 to a greater or lesser extent. Due to the pressure of the gas in the tank, the elasticity of the washer 26, or possibly by interposing an elastic gasket between the cup 27 and the part 23, in the manner of the gasket 30 described in the aforementioned Patent No. 3,218,831, there is obtained the automatic return of the sleeve 37, 38 to the position of rest shown in FIG. 6 as soon as the pressure on the surface 38a is relaxed.

Furthermore, in known manner and as furthermore described in the aforementioned Patent No. 3,218,831, the raising of the burner 7 and of the piston 30, 33 and its gasket 34 by the lever 6 of FIG. 4, frees a passage for the gas from the tank via the wick 25, the washer 26, the bore 28, the bore 45 and the channels 32 and 31.

FIGS. 7 to 12 show the principle of different means for pushing the sleeve 37, 38 into a greater or lesser extent.

In the case of FIG. 7, a lever and cam system is employed. A lever 47 pivoted at one end at 48 to the body of the lighter (not shown) rests via a bulge 49 against the surface 38a of the piston 38. A cam 50 mounted on a shaft 51 which is also borne by the body of the lighter acts on the other end of the lever 47 to pivot it in the direction indicated by the arrow F1 when the cam turns in the direction indicated by the arrow F2. In FIG. 6, the lever 47 with its bulge 49 and the cam 50 have been shown very schematically in dot-dash lines.

In the case of FIG. 8, a direct cam system is employed. The cam 50 which is pivoted at 51 acts directly on the piston 38 when it is turned in the direction indicated by the arrow F2.

In the case of FIG. 9, a direct screw system is used. A screw 52 threaded in a stationary part 53 of the body of a lighter and provided with an operating head 54 acts directly on the face 38a of the piston 38 when it is screwed so as to move it in the direction of the arrow F3.

In the case of FIG. 10, a push-screw and lever system is used. The screw 52, 54 acts on one end of a lever 47, 49 to turn it in the direction indicated by the arrow F1 when the screw is displaced in the direction indicated by the arrow F3.

In the case of FIG. 11, a traction-screw and lever system is employed. The screw 52', 54' has a stem of great length and upon being screwed into the fixed part 53' of the body of the lighter so as to move in the direction of the arrow F3, it drives with it the end of a lever 47', 49' opposite the pivot 48' to which it is fastened by a head 55 which cannot pass through a hole 56 provided in the lever.

Finally, in the case of FIG. 12, an opposed-screw system is used. The upper face of the piston 38 rests directly against a stationary part 57 of the body of the lighter, which is traversed via an opening 58 by the burner-piston 7, 30. The bottom 59 of the lighter is pierced by a threaded hole 60 in which there can be screwed a screw 61 having an operating head, which screw rests against the bottom of the tank 16 along the axis A—A of the valve body 17 and of the burner 7. Upon tightening the screw 61, the tank 16 and the assembly 17, 40, 38 are displaced in the direction indicated by the arrow F4 so as to cause the sleeve 38 to penetrate into the screw 40 until—at the maximum—the upper face 40a of the screw 40 comes into contact with the lower face 57a of the part 57.

The last two systems, however, accommodate themselves rather poorly to a shape of lighter such as that shown in FIGS. 1 to 4, and are more suitable for a lighter of more conventional shape. In the case of the system of FIG. 11, the part 53' can form a portion of the bottom of the housing, the tank 16 does not occupy the entire inside of the housing, and the head 54' of the screw 52' preferably protrudes through an opening provided in the said housing. In the case of the system of FIG. 12, the housing is practically entirely closed at its upper part 57 except for the hole 58 for the passage of the burner 7, but it is open at its lower part to receive first of all the tank 16 with the valve 17 and then a bottom 59 provided with the screw 61 and finally, preferably, a second smooth bottom, which avoids any accidental unscrewing and any loss of the screw 61 by rubbing in the pocket of a user. In both cases, the lighter control mechanism is preferably similar to that which forms the subject matter of U.S. Patent No. 2,943,471 issued July 5, 1960, and is mounted on the upper part of the housing of the lighter in a free space provided above the lever 47 or above the partition 57; the latter may furthermore be replaced by a specific extension from the bottom 5 of the mechanism, visible in FIG. 3 of this patent.

With reference to FIGS. 13 to 28, there shall now be described in further detail one practical embodiment of the system, the principle of which was shown in FIG. 7.

Figure 16:
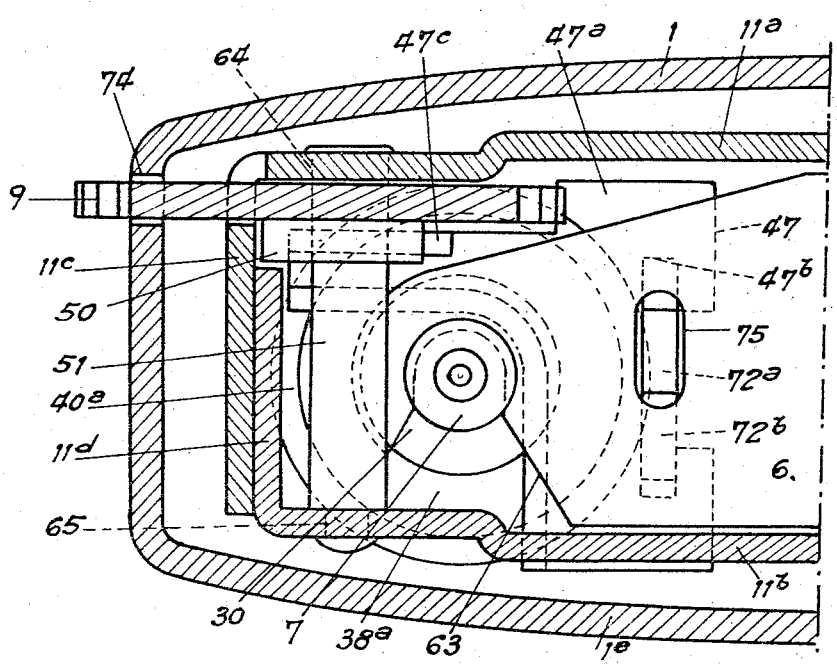
FIG. 16 is a horizontal section along the line XVI—XVI of FIG. 13.

In FIGS. 13 to 24, it can be seen that the belt 11 comprises two cheeks 11a and 11b which are substantially parallel to the shells 1 and 1a respectively. The cheek 11a terminates toward the front of the lighter in a portion 11c which is bent substantially at a right angle, and the cheek 11b in a similar portion 11d. The cheek 11d is slightly bent toward the inside at its lower part at 11e to form a guide for the positioning of the tank 16 and of the valve 17, the edge of the portion 11e fitting in the annular groove 42 of the screw 40. The cheek 11b is cut out at 62 to permit passage of the burner 7 upon the placing of the tank 16 in the belt 11. For the same reason, the lift lever 6 is cut out at 63 as shown in FIG. 16. The cheeks 11a and 11b are pierced with holes 64 and 65 respectively for the passage of the pin 51 of the knurled wheel 9 and of the cam 50 and with holes 66, 67 for the passage of the pin 5 of the knurled wheel 4. Furthermore, the cheek 11b at its lower portion which is curved at right angle forms a partial bottom 68 pierced by an opening 69 and extending on the one hand downward at 70 parallel to the cheek 11a and against it, and at 71 perpendicular to it and on the other hand upward at 72, 72a via a sort of plate, the role of which will be explained further below. The extension 70 serves to support the flint-holding tube 14 and the opening 69 permits the passage of the flint toward the knurled wheel 4. Finally, it will be noted that the cheek 11d has on its free vertical side a cutout 73 intended to permit the passage of the cam 50.

Furthermore, of course, the shell 1 is pierced by a hole 74 to permit the passage of the wheel 9.

Figure 14:
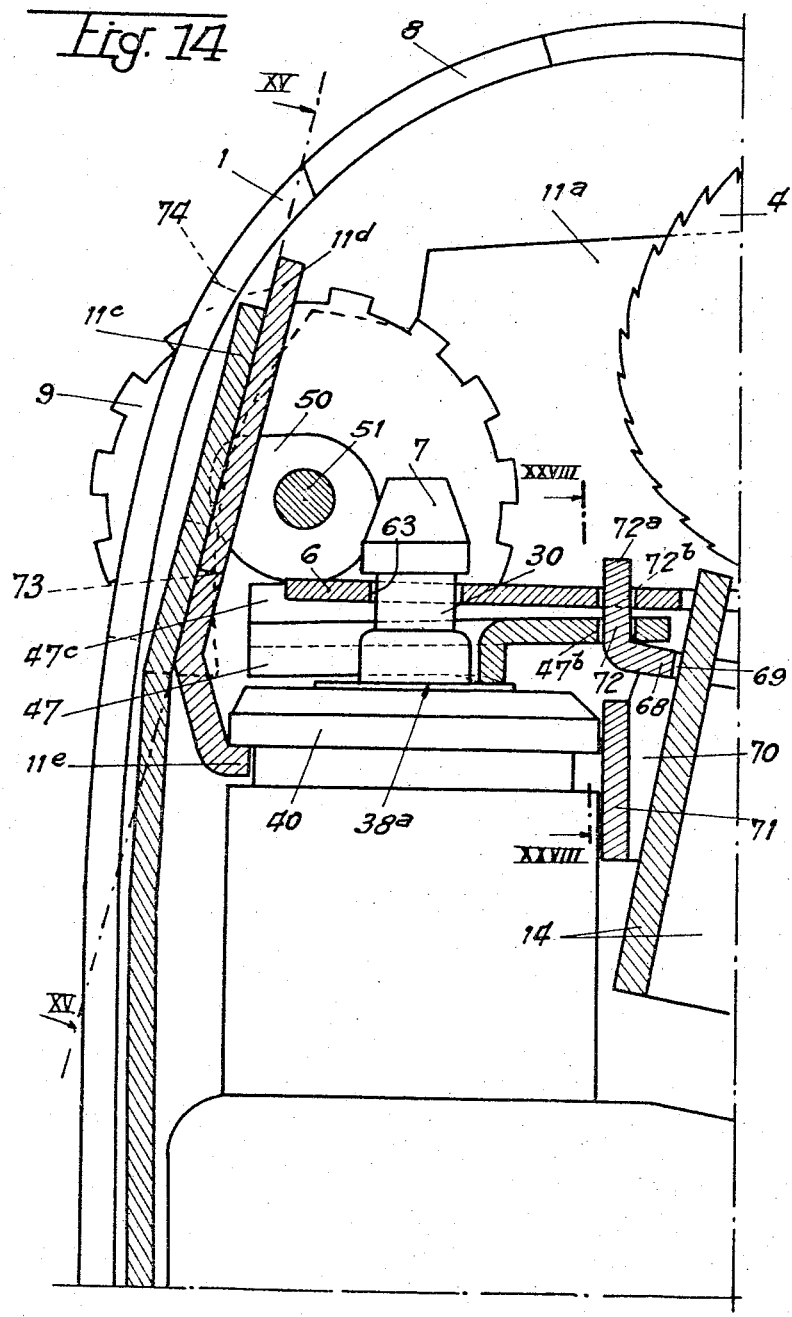
FIG. 14 is a partial central cross-section through the lighter on the same scale as FIG. 13, but along the plane of FIG. 4.
Figure 15:
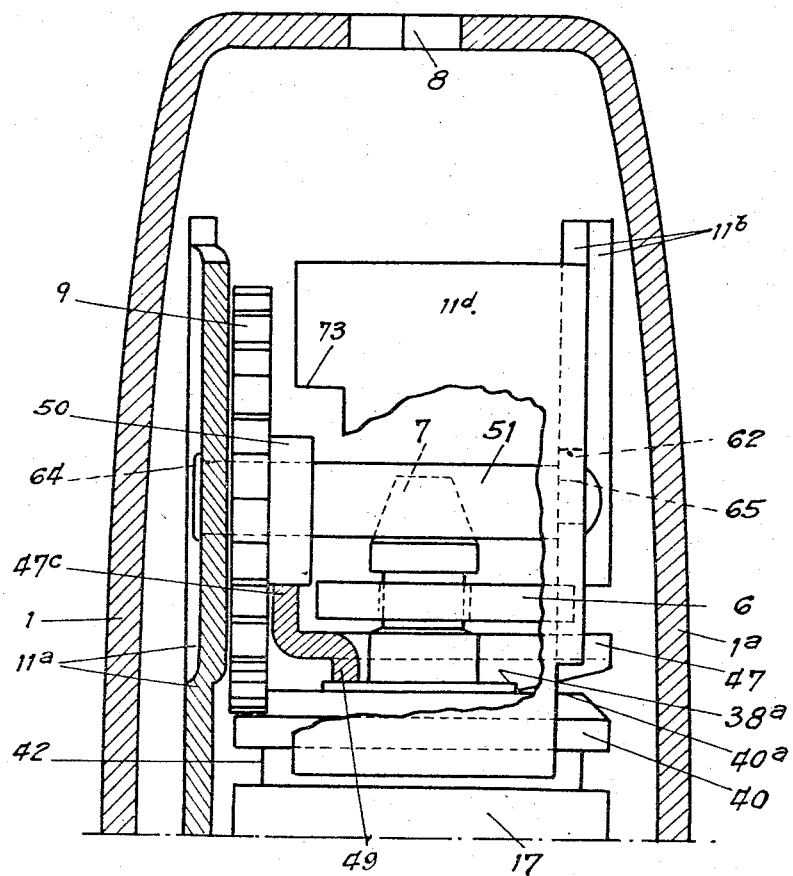
FIG. 15 is a cross-section, partially torn away, along the line XV—XV of FIGS. 13 and 14, but with the knurled wheel and the fine adjustment cam seen in elevation.

Finally, FIGS. 25 to 28 show the shape and pivoting system of the fine-adjustment lever 47. It comprises a smooth surface 47a, the shape of which is clearly visible in FIG. 25. This surface has a cut-out 47b in the shape of a T, which cooperates wtih the plate 72, an upward projection 47c and a downward-directed rib 49 which constitutes the bulge referred to in connection with FIG. 7. The projection 47c cooperates with the cam 50 and the projection 49 cooperates with the face 38a of the sleeve 38. The assembly consisting of the cut-out 47b and the plate 72 forms a pivot for the lever assembly (this is the equivalent of the pivot 48 of FIG. 7). The plate 72 has a central projection 72a which engages in a buttonhole 75 in the valve lever 6 (FIGS. 14, 16 and 28). This lever in its turn rests on the upper face 72b of the plate 72 on both sides of the protrusion 72a.

The operation of the mechanism is as follows: The cheeks 11a, 11c and 11b, 11d, 11e are assembled by spot welding at spots suitably distributed to form the belt 11 and the flint-holder tube 14 is welded to the extension 70. The lighting mechanism is put in position, it comprising the push member 2 with its spring 2a, the driver 3, the knurled wheel 4, the levers 6 and 47 and the flint-push lever 13 with its retraction lever 15 and the adjusting mechanism comprising the wheel 9 and the cam 50, and the various said members are maintained in position by means of their respective pins which pass through all the cheeks of the belt 11. If a flint is introduced at 14 against the knurled wheel 4, the lighter can operate after positioning the tank 16 and the valve 17 with the groove 42 in engagement with the rim 11e and the head 7 of the burner in engagement with the cut-out 63 of the lever 6.

The various parts being in position and the screw 40 having been turned by hand or by means of a special instrument to adjust the compression of the washer 26 to a value corresponding to the average value desired, with the cam 50 in contact with the projection 47c of the lever 47 occupying the position shown in FIG. 4, and the rib 49 in contact with the face 38a of the sleeve 38 in average protruding position, the height of the flame can be increased by turning the cam 50 by means of the wheel 9 in clockwise direction so as to reduce the height of the part of the cam located between the pin 51 and the face 38a; the piston 38 then rises slightly, relaxing the pressure on the washer 26, and a larger amount of gas can escape when the burner 7 is raised. The height of the flame can be reduced by turning the cam 50 in counter-clockwise direction as to increase the height of the portion of the cam located between the pin 51 and the face 38a; the piston 38 then descends and further compresses the washer 26 which reduces the stream of gaseous fuel. One can also adjust the starting position of the cam 50 in such a manner as to exert on the piston 38 an action which all times acts in the same direction, in which case the initial adjustment will be effected either for a maximum height or for a minimum height of the flame, and the adjustment will be possible only in a single direction. However, of course, it is possible at any moment to take the lighter apart and to turn the screw 40 within the limits imposed by the construction of the valve, that is to say, to adjust the average height of the flame as a function of the presumed continuing conditions of use of the lighter.

It is to be understood that the embodiments described and shown have been given only by way of example and may be subjected to various modifications without going beyond the inventive concept. In particular, one could provide other means for assuring the fine adjustment, for instance impart to the thread of the bore 19 and to the thread of the screw 40 different thread heights, so that the screwing can be effected by the coming into engagement of the upper part of the thread under the effect of the pressure of the gas contained in the tank, which tends to push the assembly 23, 26, 27, 40 upward in FIG. 6, but by pressing on the face 40a, one can cause the screw assembly to descend with respect to the bore 19; in this case, the sleeve 38, 37 would be useless and the valve would be more like—with the exception of its thread—to the valve of the aforementioned Patent No. 3,218,831. One could also use a direct acting cam (principle shown in FIG. 8) which cam, however, would be driven from the wheel 9 by a chain of gears if this measure were desirable in order to facilitate the construction. Finally, in the case of FIGS. 9 and 10, the part 53 into which the screw 52, 54 screws could be made of a sort of brace connecting the cheeks 11a and 11b of FIGS. 13 to 16.

I claim:

1. A gas fuel lighter having means for making coarse adjustment of a flow of fuel from the fuel tank of said lighter and means for making fine adjustment of said flow to control the size of the flame produced by said lighter, which lighter comprises a casing, a fuel tank with a valve for releasing a flow of fuel, means for opening and closing said valve and means for igniting said flow of fuel, said valve having a body member attached to said tank with gas passage means therethrough, said passage means having a compressible porous member therein whose porosity is a function of its state of compression, a rotatable collar threaded into said body for compressing said porous member to coarsely adjust the flow of fuel through said passage and a sleeve slidable within said body for compressing said porous member to finely adjust said flow of fuel, said sleeve being actuated by means external to said casing operably connected to said sleeve.

2. A lighter according to claim 1 wherein said collar bears against a shoulder of said sleeve and urges said sleeve against said porous member to compress said member.

3. A gas fuel lighter having means for coarsely adjusting and means for finely adjusting the size of the flame produced by said lighter by adjusting the flow of fuel to be burned comprising a casing with means for actuating a flow of fuel, means for finely adjusting said flow and means for igniting said flow, a fuel tank for containing said fuel with a valve for releasing said flow of fuel, said valve having a body with a partially threaded bore therethrough attached to said tank, a shoulder within said bore, a compression seat abutting said shoulder, a porous compressible member on said seat, a cup-like member overfitting said porous member for compressing it against said seat, said cup-like member having a bore therethrough and a neck portion forming a valve seat, a hollow valve stem having a gasket at one end for closing said valve seat and its opposite end projecting beyond said body, a slidable sleeve member having an external shoulder around said stem and one end bearing against said cup-like member, spring means between said sleeve and stem for seating said stem against said valve seat, and an externally threaded rotatable collar around said sleeve bearing against the shoulder thereof and screwed into said partially threaded body bore, said sleeve protruding beyond said collar, said means for finely adjusting said flow engaging said protruding end of said sleeve and being operable from externally of said casing, and said fuel flow actuating means engaging said valve stem, whereby rotation of said collar varies the compression of said porous member by said sleeve to adjust coarsely the fuel flow through said valve and compression of said porous member by said sleeve can be varied from externally of said casing to adjust finely said fuel flow.

4. A lighter according to claim 3 wherein said means for finely adjusting said flow comprises a rotatable cam, supported from said casing, whose eccentric surface bears against the protruding end of said sleeve.

5. A lighter according to claim 3 wherein said means for finely adjusting said flow comprises a rotatable cam, supported from said casing, whose eccentric surface bears against a pivoted lever bearing against the protruding end of said sleeve.

6. A lighter according to claim 3 wherein said means for finely adjusting said flow comprises a screw, supported from said casing, one end of which bears against the protruding end of said sleeve.

7. A lighter according to claim 3 wherein said means for finely adjusting said flow comprises a screw, supported from said casing, one end of which bears against a pivoted lever bearing against the protruding end of said sleeve.

8. A gas fuel lighter having a casing, a fuel tank within said casing, a valve in said fuel tank for releasing a flow of fuel, and means on said casing for igniting said flow of fuel, rotatably operable means within said valve for coarsely adjusting said flow of fuel, linearly operable means within said valve for finely adjusting said flow of fuel, and means operable from externally of said casing for effecting linear movement of said linearly operable means, whereby the flow of fuel from said valve and the flame produced by the burning of said fuel can be separately adjusted both coarsely and finely.

9. A gas fuel lighter having a casing, means for igniting a flow of fuel, and a fuel tank with a valve for releasing said flow of fuel, said valve having first means rotatably operable from inside of said casing for coarsely adjusting said flow of fuel by a rotary movement within said valve, and second means linearly operable from outside of said casing for finely adjusting said flow of fuel by a linear movement within said valve, whereby the size of the flame produced by burning said flow of fuel can be controlled.

References Cited by the Examiner

UNITED STATES PATENTS

| 3,114,249 | 12/1963 | Lowenthal | 67—71 |
| 3,184,931 | 5/1965 | Yoshino | 67—7.1 |
| 3,213,649 | 10/1965 | Sakamoto | 67—7.1 |

EDWARD J. MICHAEL, *Primary Examiner.*